United States Patent
Garcin et al.

(10) Patent No.: US 9,445,327 B2
(45) Date of Patent: Sep. 13, 2016

(54) CELL SELECTION TECHNIQUES FOR FEMTOCELL MEASUREMENTS

(71) Applicant: Broadcom Corporation, Irvine, CA (US)

(72) Inventors: Romain Marie Pierre Raymond Garcin, Caversham (GB); Sudip Alexei Gupta, Bracknell (GB); Abhishek Pandit, Wokingham (GB); Yongqian Wang, East Brunswick, NJ (US); Yuan Liu, Holmdel, NJ (US); Sethuraman Gurumoorthy, Piscataway, NJ (US); Sridhar Prakasam, Morganville, NJ (US); Sultan Budhwani, Laurence Harbor, NJ (US)

(73) Assignee: Broadcom Corporation, Irvine, CA (US)

( * ) Notice: Subject to any disclaimer, the term of this patent is extended or adjusted under 35 U.S.C. 154(b) by 54 days.

(21) Appl. No.: 14/089,090

(22) Filed: Nov. 25, 2013

(65) Prior Publication Data
US 2015/0024759 A1 Jan. 22, 2015

Related U.S. Application Data

(60) Provisional application No. 61/900,516, filed on Nov. 6, 2013, provisional application No. 61/847,237, filed on Jul. 17, 2013, provisional application No. 61/859,874, filed on Jul. 30, 2013, provisional application No. 61/867,298, filed on Aug. 19, 2013.

(51) Int. Cl.
*H04W 4/00* (2009.01)
*H04W 36/00* (2009.01)
*H04W 84/04* (2009.01)

(52) U.S. Cl.
CPC ....... *H04W 36/0094* (2013.01); *H04W 84/045* (2013.01)

(58) Field of Classification Search
CPC ... H04W 24/00; H04W 24/10; H04W 84/45; H04W 36/0094; H04W 84/045; H04W 36/30; H04W 48/16; H04W 48/18; H04W 48/20; H04W 88/06
USPC ........... 455/160.1, 161.1, 423–425, 434, 515
See application file for complete search history.

(56) References Cited

U.S. PATENT DOCUMENTS

| | | | |
|---|---|---|---|
| 7,003,290 B1* | 2/2006 | Salonaho et al. | 455/423 |
| 2002/0006805 A1* | 1/2002 | New et al. | 455/525 |

(Continued)

OTHER PUBLICATIONS

3GPP TS 36.304 v10.6.0 (Jun. 2012) Technical Specification; User Equipment (UE) procedures in idle mode, 3GPP, Valbonne, France, 2012, 33 pages.

(Continued)

*Primary Examiner* — Thai Vu
(74) *Attorney, Agent, or Firm* — Brinks Gilson & Lione

(57) ABSTRACT

User equipment (UE) includes an architecture for handling femtocell fingerprints, and searching for femtocells. The architecture may control the frequencies for which the femtocell search is performed in various manners. For example, the architecture may schedule a round-robin list of femtocell frequencies for measurement, and may reduce the search space according to the frequency bands actually in use in the region in which the UE is located, according to whether or not reselection timers are running for specific frequencies, or in other ways.

20 Claims, 8 Drawing Sheets

(56) References Cited

U.S. PATENT DOCUMENTS

| | | | |
|---|---|---|---|
| 2008/0293419 A1* | 11/2008 | Somasundaram et al. | 455/437 |
| 2010/0015973 A1* | 1/2010 | Islam et al. | 455/434 |
| 2012/0263054 A1* | 10/2012 | Kazmi | H04W 24/10 370/252 |
| 2013/0109372 A1* | 5/2013 | Ekici | 455/422.1 |

OTHER PUBLICATIONS

3GPP TS 36.331 v10.11.0 (Sep. 2013 Technical Specification; Evolved Universal Terrestrial Radio Access (E-UTRA) Radio Resource Control (RRC), 3GPP, Valbonne, France, 2013, 308 pages.

Section 5.2.4.3 Mobility States of a UE, 3GPP TS 36.304 v10.6.0 (Jun. 2012) Technical Specification; User Equipment (UE) procedures in idle mode, 3GPP, Valbonne, France, 2012, 1 page.

Section 5.5.6.2, Speed dependant scaling of measurement related parameters, 3GPP TS 36.331 v10.11.0 (Sep. 2013 Technical Specification; Evolved Universal Terrestrial Radio Access (E-UTRA) Radio Resource Control (RRC), 3GPP, Valbonne, France, 2013, 2 pages.

Kwak, H., et al., Mobility Management Survey for Home-eNB Based 3GPP LTE Systems, Journal of Information Processing Systems, vol. 4, No. 4, Dec. 2008, 8 pages.

UMTS frequency bands downloaded from Wikipedia (http://en.wikipedia.org/wiki/UMTS_frequency_bands), Nov. 9, 2013, 6 pages.

* cited by examiner

US 9,445,327 B2

CELL SELECTION TECHNIQUES FOR FEMTOCELL MEASUREMENTS

PRIORITY CLAIM

This application claims priority to: U.S. Provisional Application Ser. No. 61/900,516, filed 6 Nov. 2013, U.S. Provisional Application Ser. No. 61/847,237, filed 17 Jul. 2013, U.S. Provisional Application Ser. No. 61/859,874, filed 30 Jul. 2013, and U.S. Provisional Application Ser. No. 61/867,298, filed 19 Aug. 2013, all of which are entirely incorporated by reference.

TECHNICAL FIELD

This disclosure relates to femtocells and facilitating wireless communication device connection to femtocells.

BACKGROUND

Rapid advances in communication technologies, driven by immense customer demand, have resulted in the widespread adoption of mobile communication devices. Many of these devices, e.g., smartphones, have sophisticated wireless connectivity options. In addition to fundamental voice call connectivity with base stations serving very large numbers of subscribers is another connection option: connecting to femtocells within, e.g., a 3G network. The femtocells typically support fewer subscribers, but may provide call quality, cost, bandwidth, or other advantages to those subscribers.

DETAILED DESCRIPTION

Figure 1:
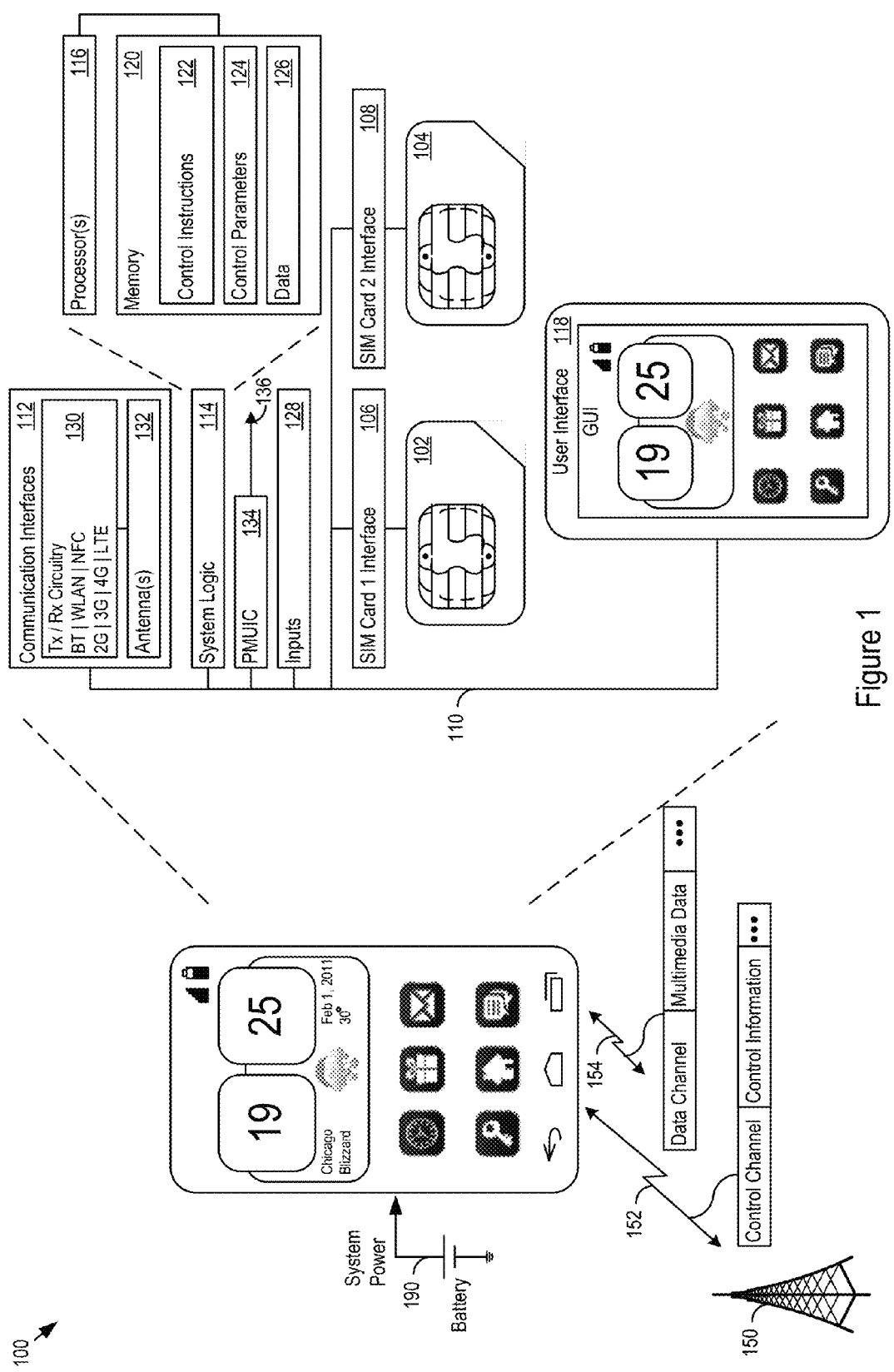
FIG. 1 shows an example of user equipment.

FIG. 1 shows an example of user equipment 100 ("UE 100"). The UE 100 is a smartphone in this example, but the UE may be any electronic device. The techniques described below regarding femtocells may be implemented in a wide array of different types of devices. Accordingly, the smartphone example described below provides just one example context for explaining the femtocell connection and communication techniques.

As one example, the UE 100 may be a 2G, 3G, or 4G /LTE cellular phone capable of making and receiving wireless phone calls, and transmitting and receiving data using 802.11 a/b/g/n/ac/ad ("WiFi"), Bluetooth (BT), Near Field Communications (NFC), or any other type of wireless technology. The UE 100 may also be a smartphone that, in addition to making and receiving phone calls, runs any number or type of applications. The UE 100 may, however, be virtually any device that transmits and receives information, including as additional examples a driver assistance module in a vehicle, an emergency transponder, a pager, a satellite television receiver, a networked stereo receiver, a computer system, music player, or virtually any other device.

FIG. 1 shows an example of the UE 100 in communication with a network controller 150, such as an enhanced Node B (eNB) or other base station. The network controller 150 and UE 100 establish communication channels such as the control channel 152 and the data channel 154, and exchange data. In this example, the UE 100 supports one or more Subscriber Identity Modules (SIMs), such as the SIM1 102 and the SIM2 104. Electrical and physical interfaces 106 and 108 connect SIM1 102 and SIM2 104 to the rest of the user equipment hardware, for example, through the system bus 110.

The UE 100 includes communication interfaces 112, system logic 114, and a user interface 118. The system logic 114 may include any combination of hardware, software, firmware, or other logic. The system logic 114 may be implemented, for example, with one or more systems on a chip (SoC), application specific integrated circuits (ASIC), discrete analog and digital circuits, and other circuitry. The system logic 114 is part of the implementation of any desired functionality in the UE 100. In that regard, the system logic 114 may include logic that facilitates, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 and the inputs 128 may include a graphical user interface, touch sensitive display, voice or facial recognition inputs, buttons, switches, speakers and other user interface elements. Additional examples of the inputs 128 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 114 may include one or more processors 116 and memories 120. The memory 120 stores, for example, control instructions 122 that the processor 116 executes to carry out desired functionality for the UE 100. The control parameters 124 provide and specify configuration and operating options for the control instructions 122. The memory 120 may also store any BT, WiFi, 3G, or other data 126 that the UE 100 will send, or has received, through the communication interfaces 112. The UE 100 may include a power management unit integrated circuit (PMUIC) 134. In a complex device like a smartphone, the PMUIC 134 may be responsible for generating as many as thirty (30) different power supply rails 136 for the circuitry in the UE 100.

In the communication interfaces 112, Radio Frequency (RF) transmit (Tx) and receive (Rx) circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 112 may include transceivers that support transmission and reception under the 2G, 3G, BT, WiFi, and 4G/Long Term Evolution (LTE) standards. The techniques described below, however, are applicable to other wireless communications technologies whether arising from the 3rd Generation Partnership Project (3GPP), GSM® Association, Universal Mobile Telecommunications System (UMTS), High Speed Packet Access (HSPA)+, or other partnerships or standards bodies.

As just one implementation example, the communication interface 112 and system logic 114 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena™ baseband processor. These devices or other similar system solutions may be extended as described below to provide the additional functionality described below. These integrated circuits, as well as other hardware and software implementation options for the UE 100, are available from Broadcom Corporation of Irvine Calif.

Figure 2:
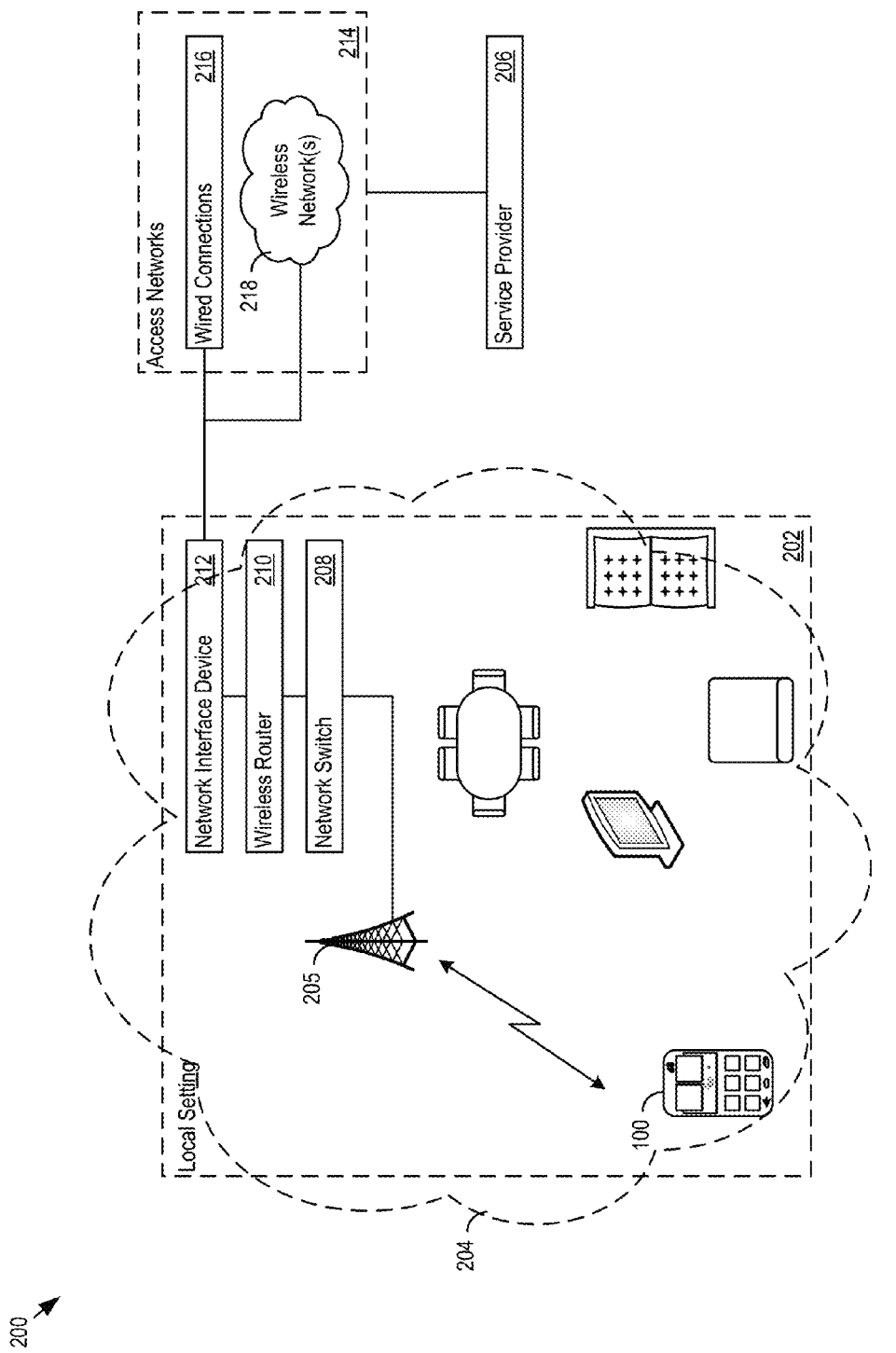
FIG. 2 shows an example architecture for a local setting with a femtocell.

FIG. 2 shows an example architecture 200 for a local setting 202 covered by a femtocell 204. A femtocell basestation 205 (e.g., a low transmit power eNB) generates the femtocell 204. The local setting 202 may be a home or office, as examples, in which one or more femtocells 204 provide cellular coverage within the local setting 202. The femtocell basestation 205 may perform the functions of a cellular basestation, for example, according to the 3GPP standard.

As just one example, the femtocell 204 may have footprint range from about 10 s to 100 s of meters, e.g., between 10 and 200 m. In a residential environment, the femtocell 204 may support, e.g., 2 to 4 active calls. The femtocell 204 increases the coverage area provided by macrocells generated by full scale outdoor base stations, and may improve data throughput and voice quality. The femtocell 204 may further reduce uplink transmission power requirements from the UE 100, because the femtocell basestation 205 is much closer, and may therefore improve the battery life of the UE 100.

In order to distinguish between a macrocell and a femtocell, the cell information broadcast by the femtocell may include a femtocell identifier and optionally a femtocell indicator flag (set to TRUE). In some cases, the femtocells may have a valid femtocell identifier and a femtocell indicator flag set to FALSE. Such cells are referred to as hybrid cells. A hybrid cell would act as a femtocell for the users authorized for connection to that femtocell and as a normal non-femtocell cell to other UEs.

Most of the broadcast (beacon) information sent by a femtocell is similar to that sent by a macrocell, except for the femtocell identifier and femtocell indicator flag mentioned above. In addition, with the introduction of femtocells, both femtocells and macrocells can optionally broadcast a list identifying known femtocell neighbor cells to help the UE 100 do cell reselection to such femtocells if the cellular radio environment warrants the reselection and if the UE 100 has a subscription to the neighboring femtocell.

The femtocell basestation 205 may connect to the service provider 206 in many different ways. In the example shown in FIG. 2, the femtocell basestation 205 connects to a port on a network switch 208. The network switch 208 connects to a wireless router 210 that also provides WiFi connectivity in the local setting 202. A network interface device 212 provides a connection to the backbone (e.g., internet service) for the local setting 202. The network interface device 212 may be a cable modem, DSL modem, T1 or T3 line, satellite transceiver, optical network interface, or other network interface device. The network interface device 212 and, therefore, the femtocell 204, connect through the access network(s) 214 to the service provider 206. The access networks may include wired connections 216, e.g., T4 or T5 lines, and wireless connections 218, e.g., microwave or satellite links.

The configuration of the femtocell 204 may include a specification of UEs that are allowed to connect to the femtocell 204 and receive service. The specification of UEs may be done in many different ways, such as by creating a whitelist of allowable phone numbers, International Mobile Station Equipment Identity (IMEI) numbers, or other identifiers. The set of UEs that have access to the femtocell 204 may therefore be closely controlled by the owner or operator of the femtocell 204. For example, in a home setting, the homeowner may configure the femtocell 204 to allow connections to the group of UEs carried by family members, friends, guests, or any other individuals. The group of UEs that have access to the femtocell 204 may be referred to as a Closed Subscriber Group (CSG).

Figure 3:
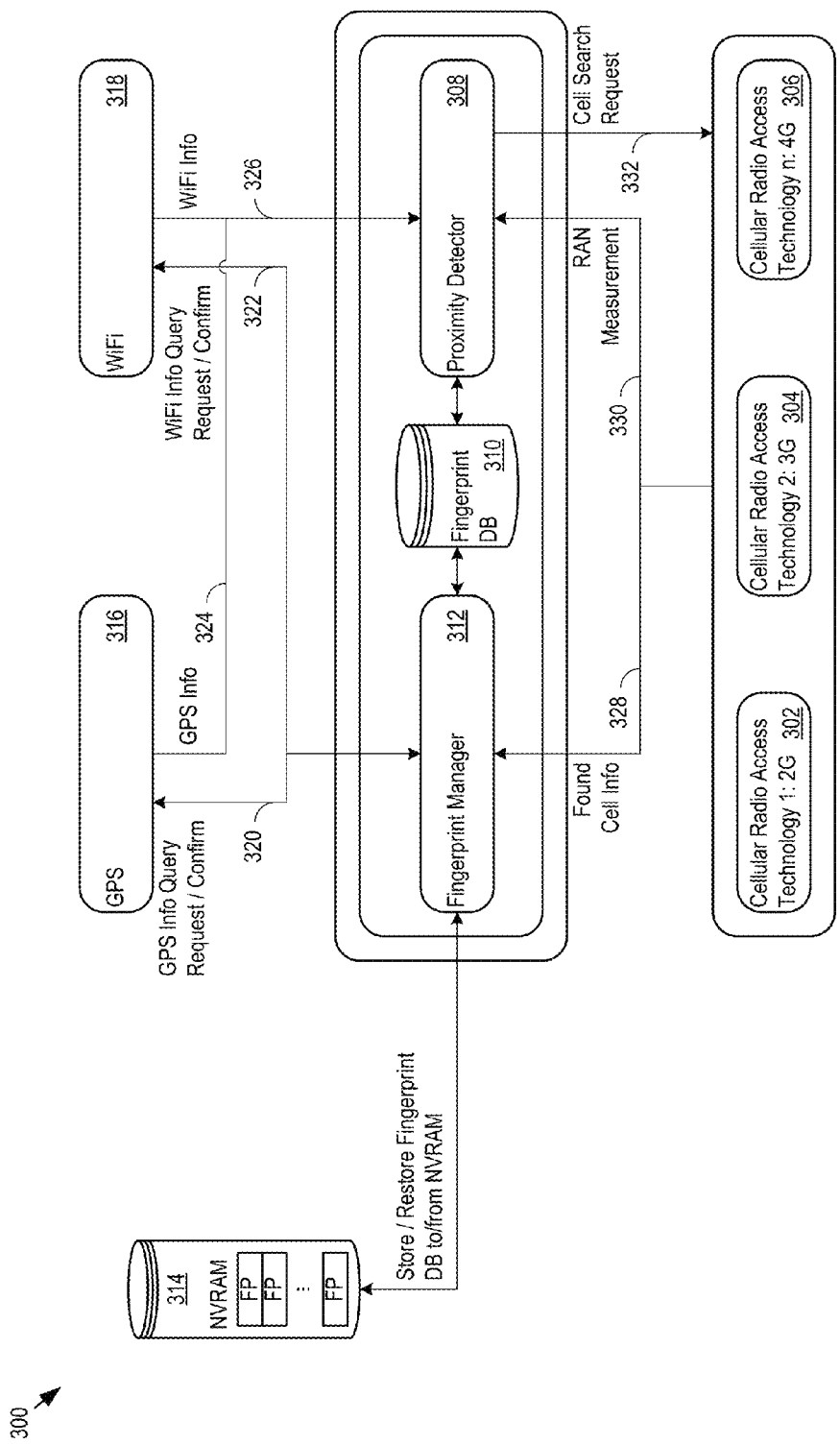
FIG. 3 shows an example fingerprinting architecture.

FIG. 3 shows an example fingerprinting architecture 300. The architecture 300 is one example of the type of system architecture that the UE 100 may implement for creating, updating, removing and otherwise managing fingerprints. There are many other ways to implement such an architecture, and the UE 100 is not limited to the architecture 300.

Note that the operator of the UE 100 may select which cell to prioritize for future selection by the UE 100. The cell may be a femtocell. In that case, the UE 100 may record characterizing information for the femtocell from any available sources. The UE 100 employs the characterizing information to subsequently determine whether the UE 100 is proximate to the femtocell, and if so, trigger an Autonomous Search Function (ASF) in an attempt to find and connect to the femtocell. The collection of characterizing information for the femtocell may be referred to as a fingerprint for that femtocell.

The fingerprint may contain multiple components, e.g., measurement inputs, that capture the characterizing information. The fingerprint components may include, as a few examples:

Global Positioning System (GPS) position;
WiFi signal strengths in the measurable environment;
WiFi Service Set Identifiers (SSIDs) for available or connected WiFi access points in the measureable environment;
timing measurements to neighbor cells;
Radio Access Technologies (RATs) used by nearby macrocells or femtocells, e.g., whether Global System for Mobile Communications (GSM), Universal Mobile Telecommunications System (UMTS), or Long Term Evolution (LTE);
Public Land Mobile Network Identifier (PLMN ID);
Global Cell Identifier (may be useful, e.g., when physical cell IDs are reused);
cell power level and signal quality measurements;
identifying information for nearby macrocells or femtocells from which the UE 100 can receive signals;

Downlink frequency to the UE 100, as examples, an Absolute Radio Frequency Channel Number (ARFCN), a Universal Mobile Telecommunications System (UMTS) Terrestrial Radio Access (UTRA) ARFCN (UARFC), or Evolved Universal Terrestrial Radio Access (EUTRA) ARFCN (EARFCN);

cell Identifiers (IDs), such as the Physical Cell Identifier (PCID), Primary Scrambling Code (PSC), and Base Station Identifier Code (BSIC); Note that a cell identifier may be a scrambling code, e.g., a 3GPP scrambling code, a physical cell identifier, e.g., a LTE physical cell identifier, or another type of data that helps identify or distinguish cells, or indicate a cell type (e.g., a femtocell type or a macrocell type);

Reference Signal Received Power (RSRP) information, e.g., the average power of Resource Elements (REs) carrying Reference Signals (RSs) over a specified bandwidth;

Received Signal Strength Indicator (RSSI) information, e.g., the received wide-band power, potentially across all received symbols and including interference and noise; and Time Delay of Arrival (TDoA) to other cells.

The UE 100 analyzes the fingerprint against measurements to determine whether the UE 100 is near a femtocell. The UE 100 may, for example, compare measurements of the environment (e.g., the currently visible SSIDs and macrocells) against the fingerprint to find a match to all or part of the fingerprint. The UE 100 may determine whether a match exists based on predetermined decision criteria that specify which parts, how much, and/or to what degree, the fingerprint components should agree with the measurements to be considered a match.

In support of fingerprinting, the architecture 300 interacts with one or more cellular RATs. In the example in FIG. 3, the RATs include a 2G RAT 302, a 3G RAT 304, and a 4G/LTE RAT 306. There may be any number or type of such RATs. The architecture 300 also includes a proximity detector 308. The proximity detector 308 may perform the analysis described above to determine whether current measurements match a fingerprint stored in the fingerprint database 310. Note that any of the RATs may return information to the fingerprint manager 312 and proximity detector 308. For example, the RATs may return cell information 328 about the macrocells and femtocells found in the vicinity, and Radio Access Network (RAN) measurements 330 that characterize the environment around the UE 100. The fingerprint manager 312 and proximity detector 308 may issue requests to the RATs as well. For example, the proximity detector 308 may initiate a cell search request 332. The cell search request 332 may be responsive to finding a matching fingerprint.

The architecture 300 also includes a fingerprint manager 312. The fingerprint manager 312 may handle the storage, recovery, addition, modification, deletion, or other management tasks on the fingerprints in the fingerprint database 310. Note that the architecture 300 may include additional storage 314 for the fingerprints, such as Non-volatile Random Access Memory (NVRAM). The fingerprints are labeled with the abbreviation 'FP' in FIG. 3.

As explained above, the fingerprints may include components of many different types. To that end, the architecture 300 may also interact with the GPS logic 316, the WiFi logic 318, or other logic. The fingerprint manager 312 may issue GPS information queries 320 or WiFi information queries 322 to the GPS logic 316 and WiFi logic 318. The GPS logic 316 and WiFi logic 318 return GPS information 324 (e.g., location coordinates or timing information) and WiFi information (e.g., SSIDs) to the proximity detector 308.

As previously explained, the proximity detector 308 may detect proximity to a previously fingerprinted cell based on one or more inputs including, as examples, RAT, WiFi, and GPS inputs. The proximity detector 308 may receive measurements periodically or on an event based basis. The proximity detector 308 may also issue measurement queries from different available component sources, such as RAT1-RATn, WiFi, and GPS. The proximity detector 308 attempts to match the measurement results against fingerprints in the fingerprint database 310 that the architecture 300 recorded for previously visited cells.

The proximity detector 308 may use the measurement inputs in a phased way. For example, the proximity detector 308 may determine a coarse match or lock based on RAN measurements. The proximity detector 308 may then obtain further measurement inputs, such as by determining whether GPS is enabled, and if so, checking proximity to a particular location specified in the fingerprint. As another example, the proximity detector 308 may determine proximity to the cell by matching a WiFi SSID, or taking additional RAN macrocell information, and may further take steps to confirm that the WiFi router has not moved or changed.

The proximity detector 308 may indicate a detection confidence level which may be used to perform a search for the cell in a power optimized way. That is, the confidence level may affect whether a search is done at all, and if so, how often and when the search is executed.

The proximity detector 308 may take into account other factors to determine whether the UE 100 will start searching for a fingerprinted cell. Examples of the other factors include cell size and velocity of travel. For instance, the proximity detector 308 may not indicate a proximity detection when a fingerprinted cell is less than a threshold size, and the UE 100 is determined to be travelling at a high speed that exceeds a speed threshold.

When the UE 100 is in Idle mode, the proximity detector 308 may trigger the currently active RAT to begin searching for (e.g., measuring) the target cell when proximity is detected. In connected mode the UE 100 may indicate proximity through signaling with the network controller 150, e.g., in the control channel 152. In connected mode, the network controller 150 may then instruct the UE 100 to attempt to connect to the target cell (the cell for which a fingerprint match was found).

The fingerprint manager 312 may add, remove, and update fingerprints based on various inputs. The inputs may include, as examples: failure to find a fingerprinted cell after search is triggered, successful reselection to fingerprinted cell, and the time to find fingerprinted cell after search is triggered.

The fingerprint manager 312 may update fingerprints wholly or partially. For instance, the fingerprint manager 312 may update, delete, or add measurements for some macrocells without affecting other components in the fingerprint. The fingerprint manager 312 may generate a fingerprint when the UE 100 enters a femtocell. In that regard, the fingerprint manager 312 may execute, for example, a full network scan to determine visible macrocells in all RATs, and, if available, WiFi, and GPS measurements. As another example, the fingerprint manager 312 may generate the fingerprint from neighbor cell measurements that the UE 100 performs as part of its normal housekeeping operations for maintaining cell connectivity, prior to reselecting to the fingerprinted cell.

The architecture 300 may use the native RAT for the matched fingerprinted cell to perform the search for the matched cell. That is, the RAT (or any other search logic)

may attempt to find the matched cell when the proximity detector 308 instructs it to do so. In that regard, the RAT may scan the frequencies associated with the matched cell in an attempt to find transmissions from the matched cell.

The RAT may take into account the proximity detection confidence level indicated by the proximity detector 308 when determining whether, when, and how often to search. For instance, a lower confidence may result in a less frequent search, helping to preserve battery life.

To confirm that the detected transmissions originate from a cell that is in fact the cell that the UE 100 is searching for, the search logic may acquire system information from the target cell. The UE 100 may do so while still camped on an existing serving cell. For instance, the UE 100 may perform background System Information Block (SIB) acquisition. The SIBs provide identifying information for the transmitting cell. The UE 100 may ensure that the cell identity matches that of the fingerprinted cell. This may help to avoid frequent failed reselection attempts. The UE 100 may also use this pre-emptive SIB acquisition to determine that the target cell meets any specified suitability criteria before the cell reselection attempt is performed, by checking SIB data against the criteria.

Alternatively, the UE 100 may choose to not perform background SIB acquisition. Instead, the UE 100 may trigger cell reselection directly without prior confirmation that the measured cell is the correct preferred cell. In this case the UE 100 may store cell selection parameters (e.g., from the system information) as part of the fingerprint when initially fingerprinting the cell. The UE 100 may use these parameters to perform pre-suitability-checking of the target cell before deciding whether a cell reselection will be performed. If the UE 100 decides to reselect and subsequently discovers that the cell is actually not the correct cell, e.g., based on checking the cell identity, Public Land Mobile Network (PLMN) indicator, or other information, the UE 100 may bar this cell from future connection attempts. The bar may last, e.g., for as long as the cell remains visible or for a predetermined time.

Measurements on Additional Femtocell Frequencies

In, e.g., Idle mode, the UE 100 may engage in a periodic cell measurement and reselection process, e.g., with timing based on discontinuous reception (DRX) periods scheduled within the UE 100. In some contexts (e.g., 3GPP adherent reselection), the UE 100 may need to detect and measure all cells on a given frequency because it may be that reselection may only be done to the strongest cell on the frequency, and all cells must be measured to make this determination. In this process, the physical layer ("PHY") may obtain measurements of the radio environment, e.g., locate cell identifiers such as physical scrambling codes on specified frequencies, and report the results to entities at higher layers, e.g., to a Radio Resource Control (RRC) layer or to the proximity detector 308. When the PHY measures, for the duration of a particular reselection time, that a neighbor cell meets reselection criteria, then the UE 100 may reselect to the neighbor cell. As just one example, the reselection criteria may include power level of a cell reference signal, such as the Received Signal Code Power (RSCP) value, or the Reference Signal Received Power (RSRP) for 4G/LTE implementations, which may give the UE 100 a reliable estimate of the path loss for a cell.

For femtocells, the PHY may need to measure for cells on additional carrier frequencies with respect to the normal neighbor cell reselection measurements. For example, there may be additional UTRA or other carrier frequencies that support femtocells that the PHY will measure in an attempt to locate the femtocells. At the same time, however, the PHY may not be able to measure all of the additional frequencies in the time normally available for reselection measurements, or measure all of the selected additional frequencies without significantly affecting normal neighbor cell reselection performance.

Figure 4:
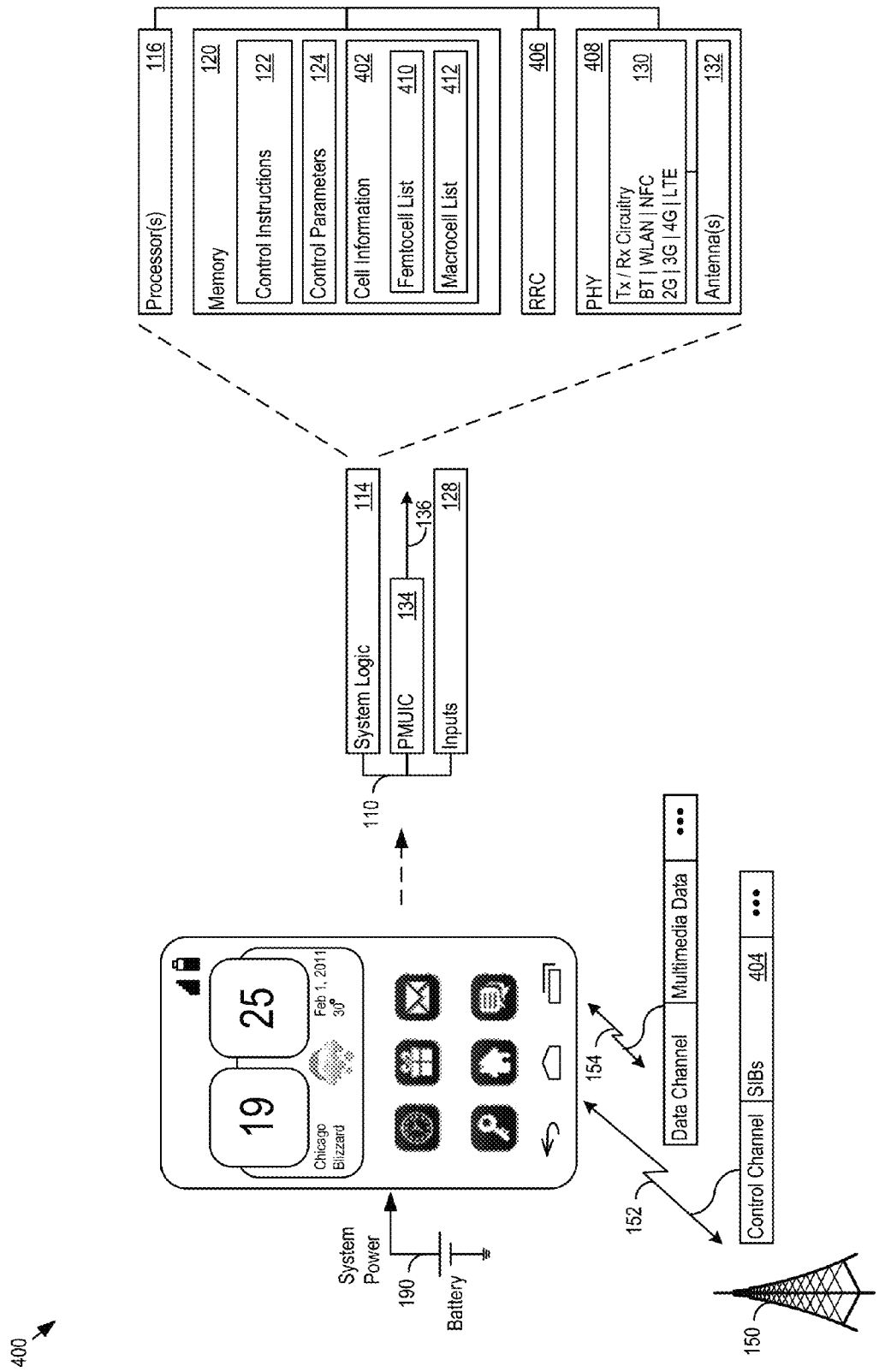
FIG. 4 shows an example network diagram.

FIG. 4 shows an example network diagram 400 in which the UE 100 receives cell information from the network controller 150. In one implementation, the UE 100 obtains cell information 402 (e.g., frequency, cell identifier, and RAT) for intra-frequency and inter-frequency neighbor cells from System Information Blocks (SIBs) 404. As examples, the SIBs may include one or more of the System Information Block (SIB) 11, SIB11.bis, SIB12, and SIB19, and the SIBs may specify dedicated femtocell frequencies, macro cells, and hybrid cells. The UE 100 may obtain cell information from other system blocks or in other ways, however.

In the UE 100, the RRC 406 may instruct the PHY 408 to search on some or all of the particular frequencies for the cells specified in the system information blocks. This may be done for the purposes of neighbor cell reselection and finding available femtocells on the list of available frequencies that support femtocells. The RRC 406 and PHY 408 may be implemented in or as part of the system logic 114, communication interfaces 112, or in other ways.

More particularly, the RRC 406 may facilitate the search on additional frequencies for femtocells by intelligently scheduling the search of the additional frequencies by the PHY 408. More particularly, the cell information 402 may include a macrocell list 410 (which may include hybrid cells) and a femtocell list 412 (which may also include hybrid cells). The information for each cell in each list may include frequency, cell identifier (e.g., scrambling code or physical cell identifier), RAT, and other parameters. The RRC 406 may schedule measurements on the femtocells in the femtocell list 412 with the PHY 408 in a manner that accommodates the normal neighbor cell reselection process.

In one implementation, the RRC 406 schedules round robin measurement of the cells in the femtocell list 412 with the PHY 408. That is, the RRC 406 instructs the PHY 408 to measure the macrocells obtained from the system information blocks for reselection purposes, and well as the additional frequencies for the femtocells. In other implementations, the RRC 406 performs other types of scheduling, such as by more frequently measuring femtocells with higher priority levels or that are most frequently camped, or according to some other schedule. In other implementations, frequencies on which there are no cells, or no cells of interest, may be measured less often, while meeting any constraints that may be applicable on reselection delay.

Figure 5:
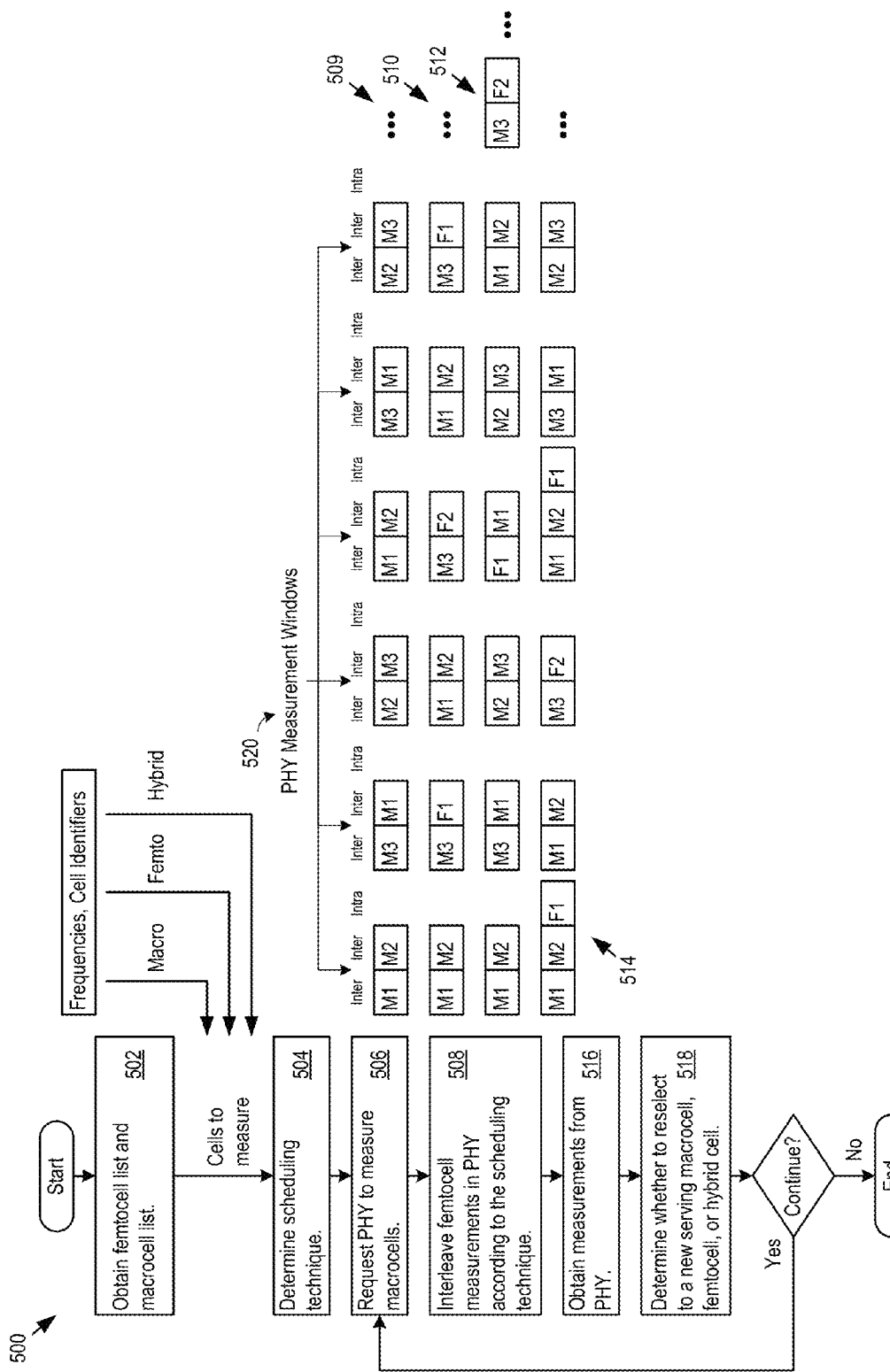
FIG. 5 shows an example of logic for measuring femtocells.

FIG. 5 shows example logic 500 for measuring the femtocells. The logic 500 obtains the femtocell list 412 and the macrocell list 410 (502). The logic 500 also determines the scheduling technique for the femtocells (504). For instance, the logic 500 may use a round robin scheduling technique. The logic 500 requests the PHY 408 to measure selected neighbor macrocells, e.g., as part of the cell reselection process. However, the logic 500 also interleaves femtocell measurements according to the selected scheduling technique (508).

Take, for example, a scenario in which the PHY 408 is able to make an intra-frequency cell measurement (e.g., measurement on the same frequency as the current serving cell), and up to two additional inter-frequency cell measurements (e.g., measurement on frequencies different than the frequency of the current serving cell). Assume that there are three neighbor macrocells M1, M2, and M3, and 2 additional femtocell frequencies F1, and F2, and that M1, M2, M3, F1, and F2 are all inter-frequency measurements.

The first distribution pattern 509 shows scheduling of the macrocells for normal cell reselection purposes, before the additional femtocell measurements are scheduled. The second distribution pattern 510 shows one possible round robin approach to scheduling the additional measurements on F1 and F2, and the third distribution pattern 512 shows a second example of round-robin scheduling. In the third distribution pattern 512, there additional femtocell measurements occur less frequently than in the second distribution pattern 510. The frequency at which the femtocell frequencies are measured for any scheduling technique may be increased or decreased according to the degree of impact permissible on the usual macrocell reselection process. The fourth distribution pattern 514 shows an example assuming that F1 is an intra-frequency measurement, and thus the PHY 5408 can perform three measurements per measurement cycle. Two measurements are inter-frequency measurements (e.g., M1, M2) and one measurement is an intra-frequency measurement (e.g., F1), as indicated by the PHY measurement windows 520.

The logic 500 obtains the measurements from the PHY 408 (516). The measurements may include indicators as to the cell identifiers (e.g., scrambling codes) that the PHY 408 located, and on which frequency they were located. The measurements may facilitate making a determination as to whether a cell meets pre-determined reselection criteria. That is, the logic 500 may also determine whether to reselect to a new serving cell that is a measured macrocell, femtocell, or hybrid cell (518).

Maturity Based Exclusion

As noted above, femtocells can increase the number of frequencies that the UE 100 would like to measure. As a further example of the increase in the number of frequencies that may need to be measured, consider the following example:

1. The UE 100 is camped on a GSM EDGE Radio Access Network (GERAN) (2G) cell on frequency G1 (the serving cell).
2. The UE 100 has a set of 2G (GERAN) macrocell neighbors on frequencies (ARFCNs) G2, G3, G4.
3. The UE 100 has a set of 3G (UTRAN) macrocell neighbors on frequencies (UARFNs) U1, U2, U3.
4. The UE 100 has a set of 4G (EUTRAN) macrocell neighbors on frequencies (EARFCNs) E1, E2, E3, E4, E5, E6, E7, E8.

The UE 100 would therefore be in a position to measure macrocells on 4 GERAN frequencies (including its serving cell)+3 UTRAN frequencies+8 EUTRAN frequencies, or a total of 15 frequencies. Note that the number of cells could also be greater than 15, as there may be multiple cells on a given frequency (especially for the UTRAN and EUTRAN frequencies) that are separated by cell identifier.

The following example adds femtocells:

5. The UE 100 has two 3G (UTRAN) femtocell neighbors CU4, CU5, corresponding to home node B cells.
6. The UE 100 also has three 4G (EUTRAN) femtocell neighbors CE9, CE10, CE11, corresponding to home e-nodeb cells.

In this example, the UE 100 may need to measure five additional frequencies that are femtocell frequencies. The example above is just one example, and for any particular radio environment and configuration, there may be additional or fewer femtocell or macrocell frequencies to measure.

Recall that the PHY 408 has limitations on the number of frequencies that it can measure, given the length of any measurement window or period during gaps in RF activity. The duration of the measurement window may vary widely, and as just one example may be on the order of a few milliseconds to tens of milliseconds. Accordingly, the UE 100 will schedule measurements to obtain an accurate view of the radio environment around the UE 100, and thus to be able to find the best cell for reselection purposes. In one implementation, the RRC 406 excludes selected frequencies from measurement by the PHY 408. As a result of the exclusion, the RRC 406 may direct the PHY 408 to measure different frequencies, such as femtocell frequencies during the measurement window.

Figure 6:
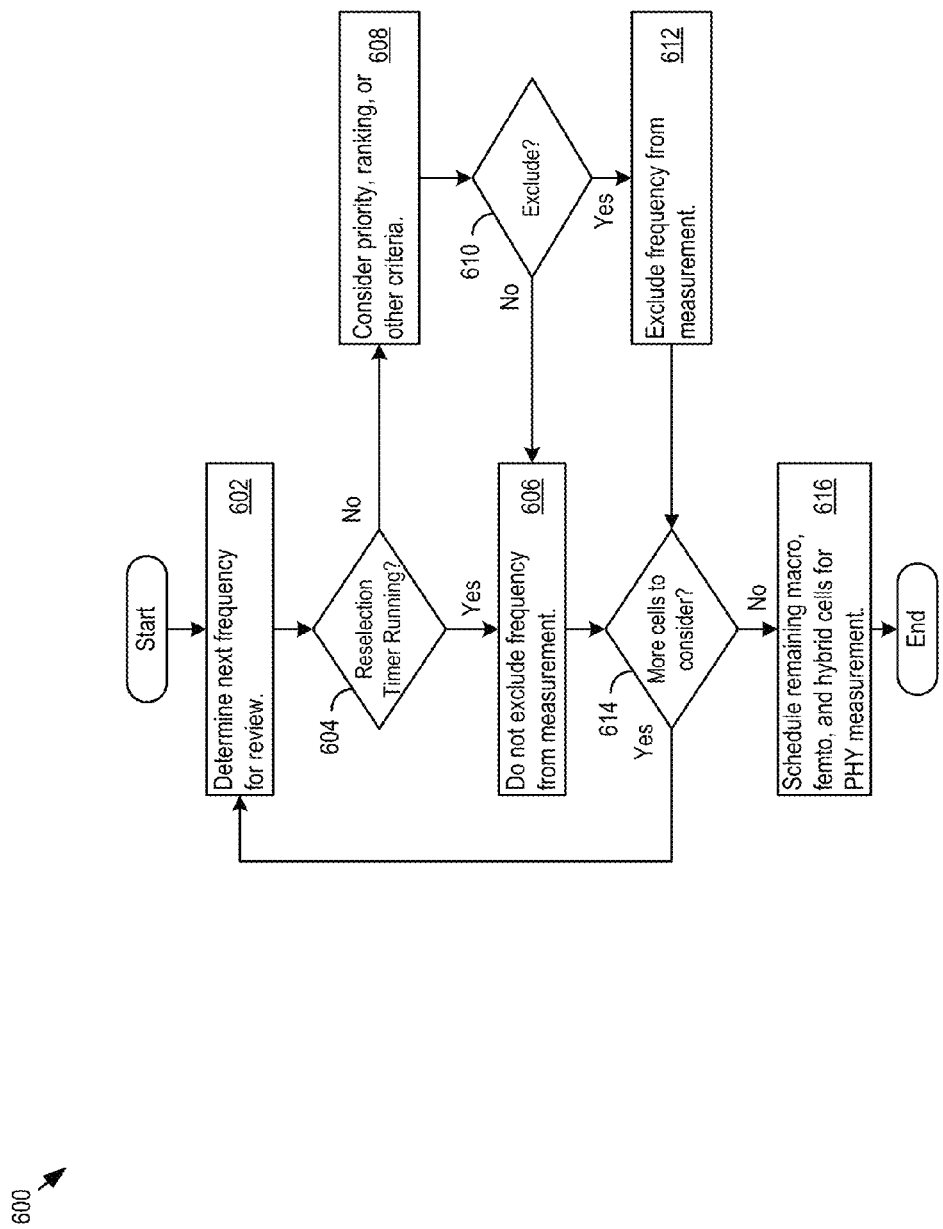
FIG. 6 shows an example of logic for excluding selected frequencies from measurement.

FIG. 6 shows an example of logic 600 for excluding selected frequencies. The logic determines the next frequency to review (602). The logic 600 may determine whether a reselection timer is running for the next frequency (604). As noted above, the reselection timer may indicate how long a particular cell has met certain reselection criteria (e.g., signal strength). Accordingly, if the reselection timer is running, then the selected frequency may be a good candidate for reselection, and the logic 600 does not exclude that frequency from measurement (606).

However, in other implementations, the logic 600 may still exclude a frequency for which a reselection timer is running. For instance, the logic 600 may exclude frequencies with reselection timers running for less than a timer threshold. As another example, the logic 600 may exclude frequencies that have a priority under an exclusion threshold. The exclusion threshold may be set by the network, by user input, pre-programmed in the UE 100 or SIM card, or according to cell connection history (e.g., more frequently camped cells may have higher priority). Additional exclusion criteria include RAT priority and cell strength. Another example of exclusion criteria includes user RAT preference (e.g., LTE preferred, 2G only, or other RAT preferences). One use case is when the user wants service in a RAT that provides high data throughput (e.g., LTE) compared to another RAT (e.g., UTRAN/GERAN), provided that the preferred RAT cell satisfies any applicable camping criteria (e.g., cell strength).

On the other hand, if the reselection timer is not running, then the logic 600 may exclude that frequency from measurement. Alternatively, the logic 600 may also consider other priority, ranking, or other cell exclusion (or inclusion) criteria (608) to determine whether to exclude (or include) the frequency from measurement (610), such as the frequency priority level noted above. The logic 600 removes frequencies from measurement that are excluded (612) (or specifically includes frequencies that should be measured), and the evaluation process may continue while there are more frequencies to consider (614). The logic 600 schedules the remaining non-excluded macro, femto, and hybrid cells for PHY measurement (616). For instance, the logic 600 may schedule the frequencies for measurement using the round-robin scheduling approach noted above.

Frequency Use Exclusion

Note that any UE will support specific frequency bands. For example, the UE 100 may support 3 to 5 3G bands and 3 to 5 LTE bands, e.g., any of 3G bands 1-26, or 4G bands 1-5, 7, 8, 11-13, or other bands. The bands define multiple cell frequencies or channels. In 3G band 01, the IMT Band, the uplink ranges from 1920 to 1980 MHz and the downlink ranges from 2110 to 2170 MHz. In the IMT band, there are 276 different channels defined. Extending this example to a UE that supports 6-10 bands would result in hundreds or thousands of possible cell frequencies that could be measured to find cells.

Figure 7:
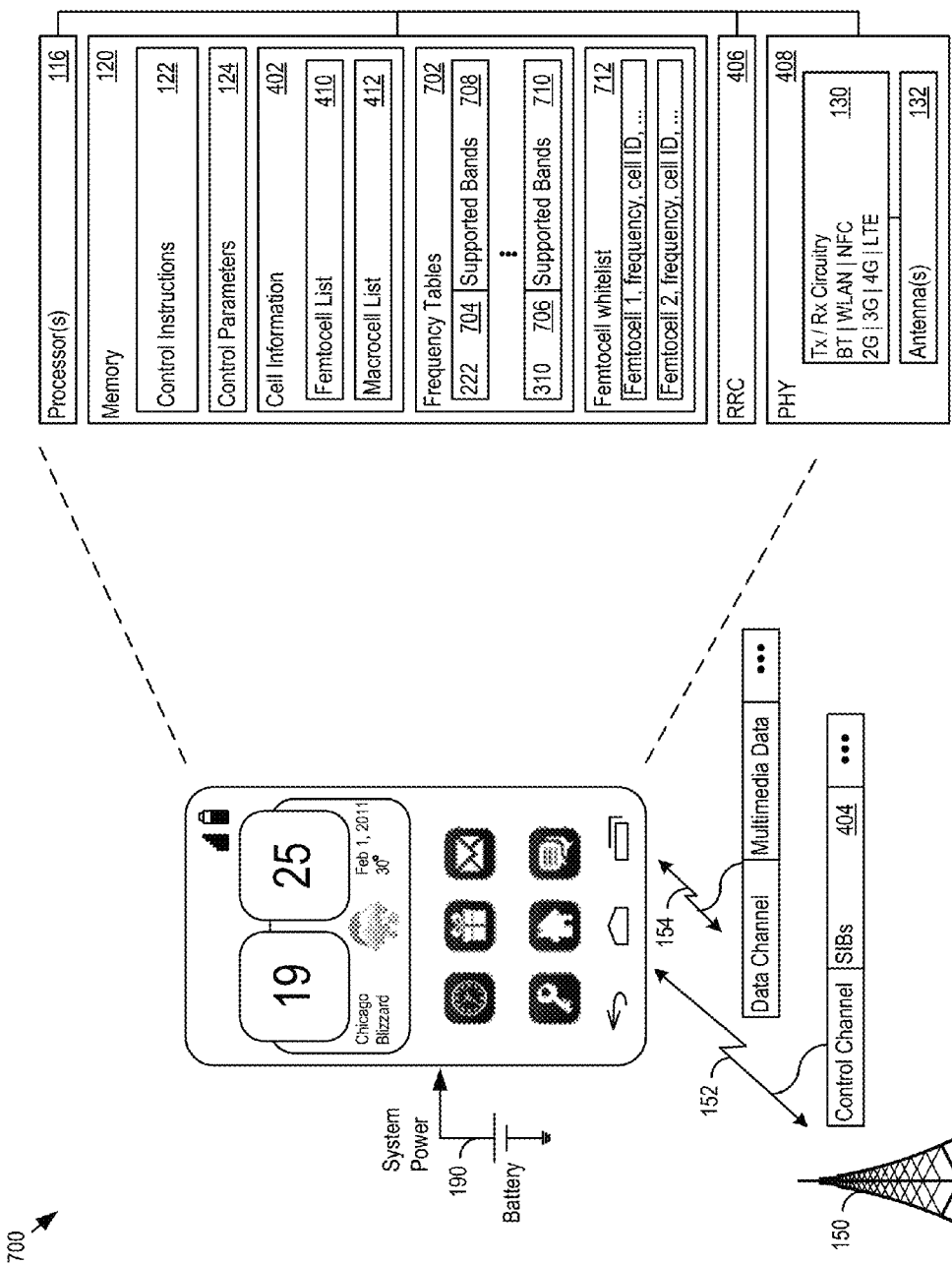
FIG. 7 shows an example of user equipment.

FIG. 7 shows an example UE 700. The UE 700 includes frequency tables 702. The frequency tables 702 may be organized by Mobile Country Code (MCC) and supported frequency bands. FIG. 7 shows two examples: MCC 704, set to 222, which corresponds to Italy, and MCC 706, set to 310, which corresponds to the United States. The tables link the MCC 704 to the supported bands 708 in Italy, e.g., MVNO, GSM 900, GSM 1800, UMTS 900, UMTS 2100, and others. The tables link the MCC 706 to the supported bands 710 in the United States, e.g., GSM 850, GSM 1900, UMTS 850, CDMA 2000 850, CDMA 2000 1900, LTE 700, and others. The tables may further specify supported bands by carrier, by including Mobile Network Code (MNC). The UE 700 may include any number of frequency tables that establish the frequency bands in use in any country and by network operator.

Figure 8:
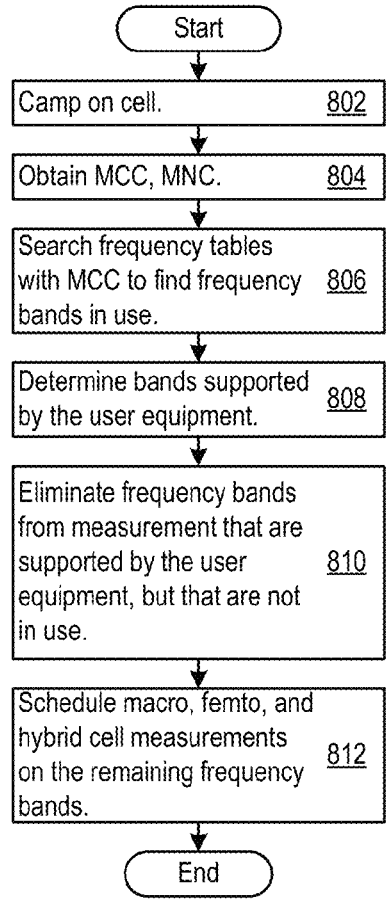
FIG. 8 shows an example of logic for excluding selected frequencies from measurement.

FIG. 8 shows an example of logic 800 for excluding selected frequencies from measurement that the UE 700 may implement. When the UE 700 camps on a cell (802), the UE 700 obtains the MCC (and optionally MNC) from the system information of the cell, e.g., from the SIB1 (804). Accordingly, the UE 700 may determine which set of frequency bands are actually in use, where the UE 700 is located geographically. For instance, the UE 700 may search the frequency tables 702 with the MCC to determine the frequency bands in use (806). Before the UE 700 camps on a cell (e.g., at initial power-on in a new country, or on a UE restart in the same country), the UE 700 may search all of its supported bands in order to find a cell, camp, and obtain the MCC and MNC.

In addition, the UE 700 may determine the frequency bands which its PHY 408 supports. For example, the UE 700 may read configuration information that is stored in the UE 700 and that specifies which frequency bands the PHY 408 supports.

The logic 800 may then eliminate from macrocell, femtocell, and hybrid measurement those frequency bands that are supported by the UE 700, but that are not in use (810). For instance, assume the UE 700 supports frequency bands GSM 1900 and LTE 700, but that the frequency bands in use are LTE 700 and UMTS 850. Then, the UE 700 may eliminate from measurement the GSM 1900 frequency band, even though the PHY 408 supports that band. Stated another way, the UE 700 may make macrocell, femtocell, and hybrid cell measurements on frequency bands that are both supported by the PHY 408 and that are in use in the geographic region where the UE 700 is located. If the UE 700 does not include a frequency table for a particular MCC, then the UE 700 may fall back to allowing a search over any of its supported frequency bands, without exclusion.

In other implementations, the UE 700 may include a whitelist of femtocells 712. The whitelist 712 may restrict the UE 700 to making connections to those femtocells specified in the whitelist 712. The femtocells may be specified by RAT, frequency, cell identifier, or other parameters, and may be previously located and fingerprinted femtocells. Note also that some cells may be blacklisted so that they cannot be connected to, either by the network or responsive to rejected prior camping attempts on the cells. Blacklisted cells may be associated with a cell bar timer running for that cell, or may be identified in other ways, such as by maintaining a list of identifiers for blacklisted cells. Blacklisted cells may be excluded for reselection as well.

The UE 700 may exclude measurements for femtocells on bands and frequencies that are not included in the whitelist 712. However, the UE 700 may continue to search for macrocells for the purposes of reselection, and certain macrocell or femtocell frequency measurements may be excluded as explained above with respect to FIG. 8 because the bands are not in use where the UE 700 is located.

Note that in some implementations previously stored femtocell fingerprints may include the MCC, MNC, or both. In that respect, the UE 700 will obtain the MCC or MNC, and the proximity detector 308 may recognize that certain fingerprints are not a match, because the MCC or MNC is different. That is, ASF may be avoided (and therefore extra measurements may be avoided), by looking for a match to the MCC, MNC, or both in the femtocell fingerprint. In other implementations, e.g., where the MCC is not part of the femtocell fingerprint, the UE 700 may perform frequency exclusion for frequency bands that the UE 700 supports, but that are not in use.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

Various implementations have been specifically described. However, many other implementations are also possible.

What is claimed is:

1. A method comprising:
   obtaining, at radio resource control (RRC) circuitry, a set of macrocell frequencies for measurement;
   scheduling reselection measurements on the macrocell frequencies;
   obtaining a set of potential femtocell frequencies;
   selecting a particular femtocell frequency from the set of potential femtocell frequencies for measurement; and
   excluding from a subsequent reselection measurement a selected macrocell frequency from the set of macrocell frequencies; and
   during a scheduled measurement window for the selected macrocell frequency, preforming, via the RRC circuitry, a measurement at the particular femtocell frequency.

2. The method of claim 1, where selecting comprises: round-robin selection.

3. The method of claim 1, where excluding comprises: excluding the selected macrocell frequency responsive to an exclusion criterion.

4. The method of claim 1, where excluding comprises:
excluding the selected macrocell frequency because no reselection timer is running for the selected macrocell frequency.

5. The method of claim 1, where excluding comprises:
determining a frequency band that is not in use; and
determining that the selected macrocell frequency is within the frequency band.

6. The method of claim 5, where determining the frequency band comprises:
obtaining a region code that indicates a current geographic region of operation; and
identifying the frequency band based on the region code.

7. The method of claim 6, where identifying comprises:
determining that the frequency band is absent in a preconfigured table that links the region code to frequency bands that are in use in the current geographic region of operation.

8. The method of claim 6, where the region code comprises:
a mobile country code.

9. A system comprising:
a radio frequency (RF) interface;
memory comprising:
   a macrocell frequency list; and
   a femtocell frequency list; and
radio resource control (RRC) circuitry in communication with the RF interface, the RRC circuitry configured to:
   determine inter-frequency and intra-frequency measurement capabilities of the RF interface during an upcoming cell reselection measurement window;
   determine a selected macrocell frequency from the macrocell frequency list to exclude from the cell reselection measurement window;
   determine a selected femtocell frequency from the femtocell frequency list to measure instead of the selected macrocell frequency; and
   schedule the selected femtocell frequency in the cell reselection measurement window as:
      an inter-frequency measurement when the selected macrocell frequency was an inter-frequency macrocell; or
      as an intra-frequency measurement, when the selected macrocell was an intra-frequency measurement.

10. The system of claim 9, where the RRC circuitry is configured to determine to exclude by:
determining that no reselection timer is running for the selected macrocell frequency;
determining that the selected macrocell frequency is not in use in a geographic location in which the system is operating;
determining that the selected macrocell frequency is subject to round-robin replacement by the selected femtocell frequency;
or any combination of the above.

11. A system comprising:
a physical layer comprising a radio frequency (RF) communication interface; and radio resource control (RRC) circuitry coupled to the RF communication interface configured to:
   obtain a set of macrocell frequencies for measurement;
   schedule reselection measurements on the macrocell frequencies;
   obtain a set of potential femtocell frequencies;
   select a particular femtocell frequency from the set of potential femtocell frequencies for measurement; and
   exclude from a subsequent reselection measurement a selected macrocell frequency from the set of macrocell frequencies; and
   during a scheduled measurement window for the selected macrocell frequency, preform a measurement at the particular femtocell frequency.

12. The system of claim 11, where:
the RRC circuitry is configured to schedule the reselection measurements by sending a round-robin scheduling request to the physical layer.

13. The system of claim 11, where the RRC circuitry is further configured to obtain the set of potential femtocell frequencies from the RF communication interface.

14. The system of claim 13, where the RRC circuitry is further configured to:
obtain the set of potential femtocell frequencies by receiving system information from a network controller in communication with the RF communication interface.

15. The system of claim 14, where the system information comprises:
any combination of system information blocks (SIB) 11, SIB11.bis, SIB 12, and SIB 19.

16. The system of claim 11, where the RRC circuitry is configured to exclude by:
comparing a reselection timer for the selected frequency to a timer threshold.

17. The system of claim 11, where the RRC circuitry is configured to exclude by:
evaluating an exclusion criterion, other than a reselection timer, applicable to the selected macrocell frequency.

18. The system of claim 11, where the RRC circuitry is configured to exclude by:
obtaining a code that indicates a geographic region of operation; and
exclude the selected macrocell frequency because it is not in use in the geographic region.

19. The system of claim 18, where the code comprises a mobile country code.

20. The system of claim 18, where the RRC circuitry is further configured to:
index the code into a frequency table to determine a frequency band including the selected macrocell frequency that is not in use in the geographic region.

* * * * *